United States Patent
Cooling et al.

(10) Patent No.: US 12,259,006 B2
(45) Date of Patent: Mar. 25, 2025

(54) CENTRIFUGAL FORCE ACTUATED DAMPER

(71) Applicant: Hamilton Sundstrand Corporation, Charlotte, NC (US)

(72) Inventors: Aaron Cooling, Rockford, IL (US); David S. Behling, Belvidere, IL (US); Glenn C. Lemmers, Jr., Loves Park, IL (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 526 days.

(21) Appl. No.: 17/736,151

(22) Filed: May 4, 2022

(65) Prior Publication Data
US 2023/0358270 A1    Nov. 9, 2023

(51) Int. Cl.
*F16C 3/02* (2006.01)
*B64D 35/00* (2006.01)
*F16F 15/14* (2006.01)

(52) U.S. Cl.
CPC .............. *F16C 3/023* (2013.01); *B64D 35/00* (2013.01); *F16F 15/145* (2013.01); *F16C 2326/43* (2013.01); *F16F 2222/08* (2013.01); *F16F 2232/02* (2013.01); *F16F 2236/08* (2013.01)

(58) Field of Classification Search
None
See application file for complete search history.

(56) References Cited

U.S. PATENT DOCUMENTS

| 2,480,946 A | 9/1949 | McDowall et al. |
| 2019/0249747 A1 | 8/2019 | Wesling et al. |
| 2020/0347908 A1 | 11/2020 | Yoo et al. |

FOREIGN PATENT DOCUMENTS

| CN | 113623361 A | 11/2021 | |
| ES | 2390095 T3 * | 11/2012 | ............... F16F 15/12 |
| JP | H04366027 A * | 12/1992 | |

OTHER PUBLICATIONS

ES-2390095-T3—English Machine translation (Year: 2012).*
JP-H04366027A—English Machine translation (Year: 1992).*
European Search Report for Application #23171667.1 dated Sep. 18, 2023; 8 pages.

* cited by examiner

*Primary Examiner* — Melanie Torres Williams
(74) *Attorney, Agent, or Firm* — CANTOR COLBURN LLP

(57) ABSTRACT

A shaft system includes an outer shaft including an inner surface defining a conduit and an inner shaft extending within the conduit. The inner shaft includes a radially extending passage having a first end and a second end. A centrifugal force activated damper extends between the outer shaft and the inner shaft. The centrifugal force activated damper includes a first member arranged between the inner shaft and the inner surface at the first end of the radially extending passage, a second member arranged between the inner shaft and the inner surface at the second end of the radially extending passage, and a connecting member extending through the radially extending passage. Rotation of the shaft system causes the first member and the connecting member to shift away from the second member into the inner surface of the outer shaft.

20 Claims, 2 Drawing Sheets

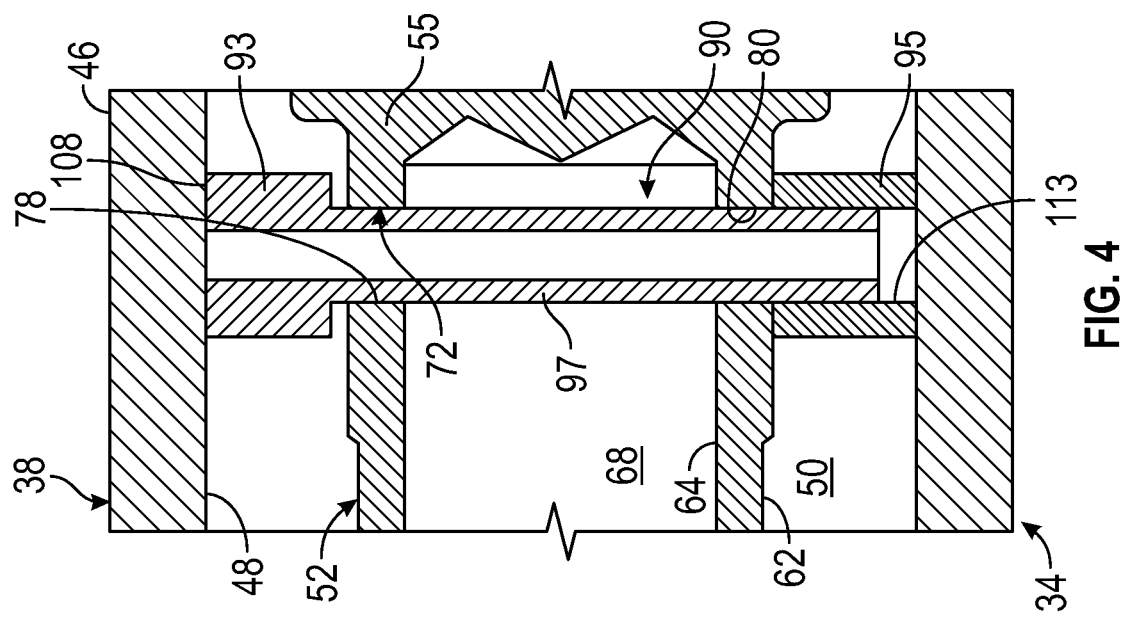
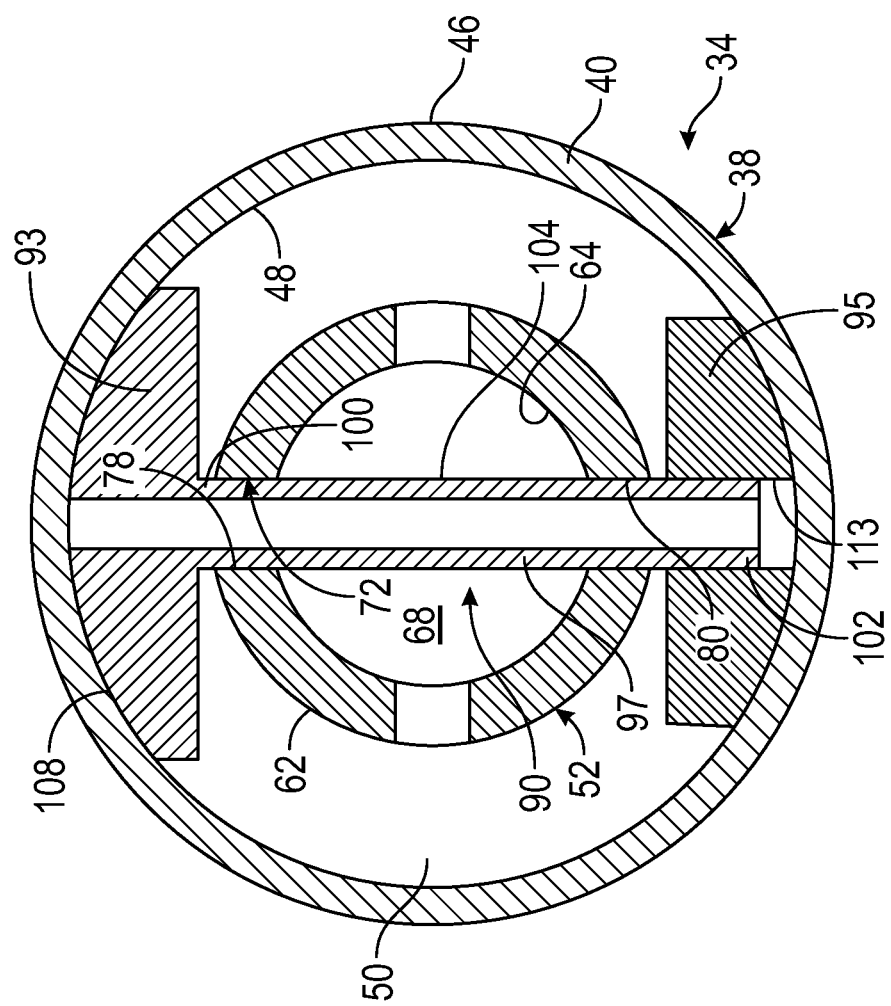

CENTRIFUGAL FORCE ACTUATED DAMPER

BACKGROUND

Exemplary embodiments pertain to the art of aircraft and, more particularly, to a centrifugal force activated damper for a shaft in an aircraft.

Aircraft include a variety of shafts that transmit power from a source to another mechanism. For example, a shaft may connect a gas-breathing engine including a turbine to a generator. That is, the shaft may have a first end connected to a turbine output and a second end connected to a generator input. In some systems, the shaft may include an inner shaft that provides an interface to the turbine and the generator and an outer, torsional shaft. At certain operating speeds, the inner shaft may oscillate relative to the outer shaft.

BRIEF DESCRIPTION

Disclosed in accordance with a non-limiting example is a shaft system having an outer shaft including an outer surface and an inner surface defining a conduit and an inner shaft extending within at least a portion of the conduit. The inner shaft includes a radially extending passage having a first end and a second end that is opposite the first end. A centrifugal force activated damper extends between the outer shaft and the inner shaft. The centrifugal force activated damper includes a first member arranged between the inner shaft and the inner surface at the first end of the radially extending passage, a second member arranged between the inner shaft and the inner surface at the second end of the radially extending passage, and a connecting member extending through the radially extending passage. The connecting member includes a first end section connected to the first member and a second end section that is received by the second member. Rotation of the shaft system causes the first member and the connecting member to shift away from the second member into the inner surface of the outer shaft.

Additionally, or alternatively, in this or other non-limiting examples, the first end section of the connecting member is fixedly connected to the first member.

Additionally, or alternatively, in this or other non-limiting examples, the first end section of the connecting member is integrally formed with the first member.

Additionally, or alternatively, in this or other non-limiting examples, the connecting member includes an outer surface portion that extends continuously from the first member to the second member.

Additionally, or alternatively, in this or other non-limiting examples, the first member includes an outer surface section that selectively engages the inner surface of the outer shaft.

Additionally, or alternatively, in this or other non-limiting examples, the contact between the outer surface section and the inner surface of the outer shaft generates a frictional force that dampens shaft oscillations.

Additionally, or alternatively, in this or other non-limiting examples, the first member includes a first mass and the second member includes a second mass that is substantially equal to the first mass.

Additionally, or alternatively, in this or other non-limiting examples, an input member is connected to the inner shaft.

Additionally, or alternatively, in this or other non-limiting examples, the outer shaft comprises a generator rotor shaft.

Additionally, or alternatively, in this or other non-limiting examples, the second member includes a central passage that is aligned with the radially extending passage, the connecting member extending into the central passage.

Also disclosed in accordance with a non-limiting example is an aircraft system including an air breathing engine including a compressor, a turbine mechanically connected to the compressor, and a combustor fluidically connected to the compressor and the turbine. A gearbox is connected to the turbine. A generator is connected to the gearbox through a shaft system. The shaft system includes an outer shaft including an outer surface and an inner surface defining a conduit and an inner shaft extending within at least a portion of the conduit. The inner shaft includes a radially extending passage having a first end and a second end that is opposite the first end. A centrifugal force activated damper extends between the outer shaft and the inner shaft. The centrifugal force activated damper includes a first member arranged between the inner shaft and the inner surface at the first end of the radially extending passage, a second member arranged between the inner shaft and the inner surface at the second end of the radially extending passage, and a connecting member extending through the radially extending passage. The connecting member includes a first end section connected to the first member and a second end section that is received by the second member. Rotation of the shaft system causes the first member and the connecting member to shift away from the second member into the inner surface of the outer shaft.

Additionally, or alternatively, in this or other non-limiting examples, the first end section of the connecting member is fixedly connected to the first member.

Additionally, or alternatively, in this or other non-limiting examples, the first end section of the connecting member is integrally formed with the first member.

Additionally, or alternatively, in this or other non-limiting examples, the connecting member includes an outer surface portion that extends continuously from the first member to the second member.

Additionally, or alternatively, in this or other non-limiting examples, the first member includes an outer surface section that selectively engages the inner surface of the outer shaft.

Additionally, or alternatively, in this or other non-limiting examples, the contact between the outer surface section and the inner surface of the outer shaft generates a frictional force that dampens shaft oscillations.

Additionally, or alternatively, in this or other non-limiting examples, the first member includes a first mass and the second member includes a second mass that is substantially equal to the first mass.

Additionally, or alternatively, in this or other non-limiting examples, an input member is connected to the inner shaft.

Additionally, or alternatively, in this or other non-limiting examples, the outer shaft comprises a generator rotor shaft.

Additionally, or alternatively, in this or other non-limiting examples, the second member includes a central passage that is aligned with the radially extending passage, the connecting member extending into the central passage.

BRIEF DESCRIPTION OF THE DRAWINGS

The following descriptions should not be considered limiting in any way. With reference to the accompanying drawings, like elements are numbered alike:

FIG. 3 is a cross-sectional axially end view of the shaft of FIG. 2 illustrating the centrifugally actuated damper, in accordance with a non-limiting example; and FIG. 4 is a cross-sectional side view of the shaft system of FIG. 2, depicting the centrifugally actuated damper, in accordance with a non-limiting example.

DETAILED DESCRIPTION

A detailed description of one or more embodiments of the disclosed apparatus and method are presented herein by way of exemplification and not limitation with reference to the Figures.

Figure 1:
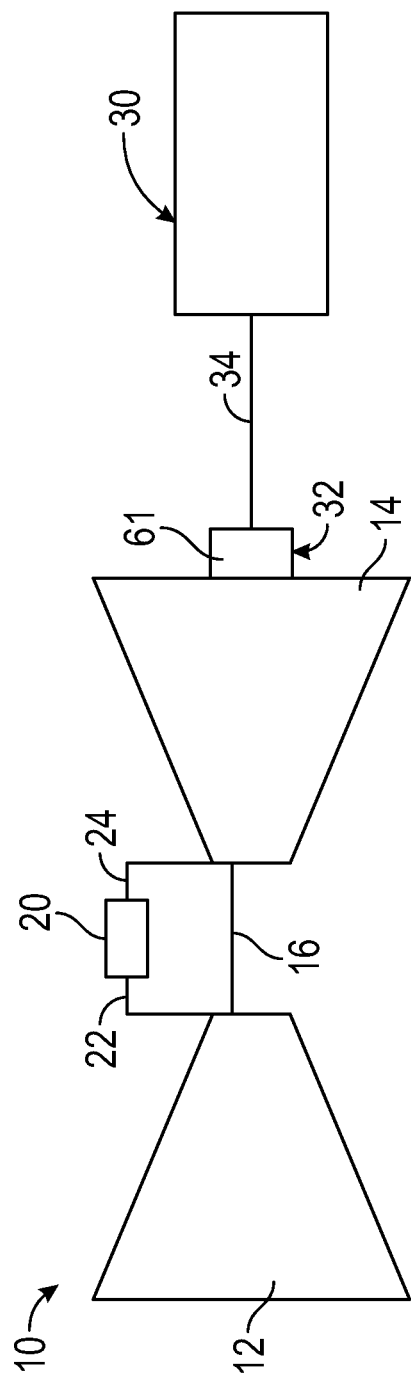
FIG. 1 depicts an air breathing engine for an aircraft connected to a generator through a shaft system including a centrifugally actuated damper, in accordance with a non-limiting example.

An aircraft system, shown in the form of an air-breathing engine is indicated generally at 10 in FIG. 1. Air-breathing engine 10 includes a compressor 12 mechanically and fluidically connected to a turbine 14. A shaft 16 mechanically connects compressor 12 with turbine 14. A combustor 20 fluidically connects compressor 12 with turbine 14. Combustor 20 includes a combustor inlet 22 connected to compressor 12 and a combustor outlet 24 connected to turbine 14. Air is passed into combustor 20 from compressor 12, combined with a fuel and combusted to form hot gases that pass into and expand through turbine 14 to create power.

A majority of the power generated by air-breathing engine 10 is used for flight operations. A portion of the power is used to drive a generator 30 that generates electrical power for the aircraft. Towards that end, generator 30 is connected to an output 32 of turbine 14 through a shaft system 34. In a non-limiting example shown in FIG. 2, shaft system 34 includes an outer shaft 38 that may define a rotor shaft 40. Outer shaft 38 is supported in generator 30 by a first bearing 42 and a second bearing 44. Outer shaft 38 includes an outer surface 46 and an inner surface 48 defining a conduit 50. Outer surface 46 may support rotor windings (not shown).

In a non-limiting example, an inner shaft 52 is arranged within conduit 50 and selectively coupled to outer shaft 38. In a non-limiting example, inner shaft 52 may be coupled to outer shaft 38 through a splined interface. Of course, other types of interfaces, both mechanical and otherwise are contemplated. Inner shaft 52 includes a first end 55 and a second end 57. Second end 57 is opposite first end 55. First end 55 includes an input member 59 that provides an interface with turbine output 32. In a non-limiting example, turbine output 32 may take the form of a gearbox 61 (FIG. 1). Inner shaft 52 includes an outer surface section 62 and an inner surface section 64 that forms a hollow interior 68.

Figure 2:
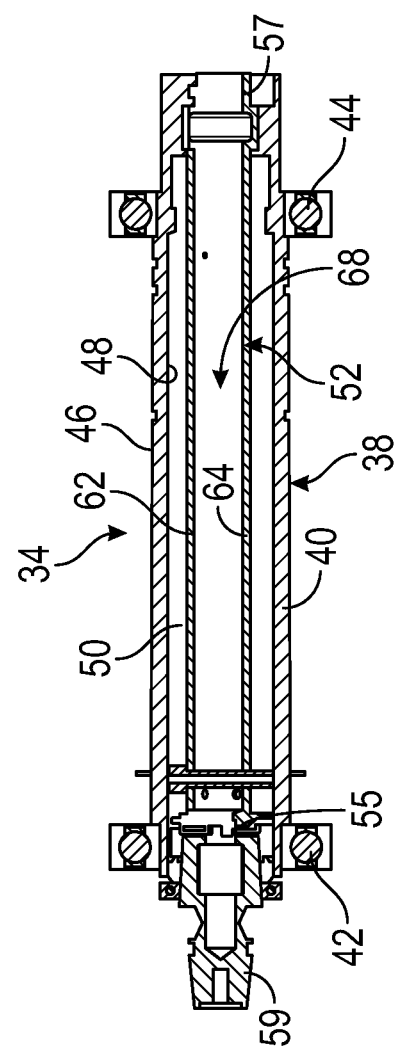
FIG. 2 is a cross-sectional side view of the shaft system of FIG. 1, in accordance with a non-limiting example.

Referring to FIGS. 3 and 4 and with continued reference to FIG. 2, inner shaft 52 includes a radially extending passage 72 arranged proximate to first end 55. Radially extending passage 72 includes a first passage portion 78 extending through outer surface section 62 into hollow interior 68 and a second passage portion 80 that is directly opposite first passage portion 78. Second passage portion 80 extends through outer surface section 62 into hollow interior 68.

In a non-limiting example, shaft system 34 includes a centrifugal force (CF) actuated damper 90 that reduces torsional differences between outer shaft 38 and inner shaft 52. CF actuated damper 90 includes a first member 93, a second member 95, and a connecting member 97. First member 93 is arranged between inner shaft 52 and inner surface 48 of outer shaft 38 at first passage portion 78 and second member 95 is arranged between inner shaft 52 and inner surface 48 of outer shaft 38 at second passage portion 80. Connecting member 97 extends through radially extending passage 72 and includes a first end section 100 coupled to first member 93 and a second end section 102 arranged at second member 95. Connecting member 97 includes an outer surface 104 that extends between first end section 100 and second end section 102. Outer surface 104 is continuous in a non-limiting example. First member 93 possesses a first mass and second member 95 possesses a second mass that acts as a counter-balance to reduce an out-of-balance condition that could lead to unwanted vibrations.

In a non-limiting example, first end section 100 is fixedly attached to first member 93. In another non-limiting example, first end section 100 is integrally formed with first member 93. Second end section 102 may float relative to second member 95 in accordance with a non-limiting example. In a non-limiting example, second end section 102 is slidingly received by a passage 113 formed on second member 95. That is, when shaft system 34 is exposed to rotational forces, first member 93 and connecting member 97 may move radially outward to frictionally couple inner shaft 52 and outer shaft 38 so as to dampen oscillations of the outer shaft relative to the inner shaft that may promote undue wear of shaft system components.

In a non-limiting example, first member 93 includes an outer surface section 108 that selectively engages inner surface 48 of outer shaft 38. In a non-limiting example, as shaft system 34 rotates first member 93 shifts radially outwardly causing outer surface section 108 to engage with inner surface 48 of outer shaft 38. As centrifugal force increases on first member 93, outer surface 108 of first member 93 is forced into inner surface 48 of outer shaft 38. Relative motion between outer surface section 108 and inner surface 48 of outer shaft 38 creates a frictional reaction force that resists or dampens oscillations that may be generated.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A shaft system comprising:
   an outer shaft including an outer surface and an inner surface defining a conduit;
   an inner shaft extending within at least a portion of the conduit, the inner shaft including a radially extending passage having a first end and a second end that is opposite the first end; and
   a centrifugal force activated damper extending between the outer shaft and the inner shaft, the centrifugal force activated damper including:
      a first member arranged between the inner shaft and the inner surface at the first end of the radially extending passage;
      a second member arranged between the inner shaft and the inner surface at the second end of the radially extending passage; and
      a connecting member extending through the radially extending passage, the connecting member including a first end section connected to the first member and a second end section that is received by the second member, wherein rotation of the shaft system causes the first member and the connecting member shift away from the second member into the inner surface of the outer shaft.

2. The shaft system according to claim 1, wherein the first end section of the connecting member is fixedly connected to the first member.

3. The shaft system according to claim 2, wherein the first end section of the connecting member is integrally formed with the first member.

4. The shaft system according to claim 2, wherein the connecting member includes an outer surface portion that extends continuously from the first member to the second member.

5. The shaft system according to claim 2, wherein the first member includes an outer surface section that selectively engages the inner surface of the outer shaft.

6. The shaft system according to claim 5, wherein contact between the outer surface section and the inner surface of the outer shaft generates a frictional force that dampens shaft oscillations.

7. The shaft system according to claim 1, wherein the first member includes a first mass and the second member includes a second mass that is substantially equal to the first mass.

8. The shaft system according to claim 1, further comprising: an input member connected to the inner shaft.

9. The shaft system according to claim 8, wherein the outer shaft comprises a generator rotor shaft.

10. The shaft system according to claim 1, wherein the second member includes a central passage that is aligned with the radially extending passage, the connecting member extending into the central passage.

11. An aircraft system comprising:
   an air breathing engine including a compressor, a turbine mechanically connected to the compressor, and a combustor fluidically connected to the compressor and the turbine;
   a gearbox connected to the turbine;
   a generator; and
   a shaft system operatively connecting the gearbox and the generator, the shaft system includes:
      an outer shaft including an outer surface and an inner surface defining a conduit, the outer shaft member being connected to the generator;
      an inner shaft extending along at least a portion of the conduit, the inner shaft being connected to the air breathing engine via the gearbox, the inner shaft including a radially extending passage having a first end and a second end that is opposite the first end; and
      a centrifugal force activated damper extending between the outer shaft and the inner shaft, the centrifugal force activated damper including:
         a first member arranged between the inner shaft and the inner surface at the first end of the radially extending passage;
         a second member arranged between the inner shaft and the inner surface at the second end of the radially extending passage; and
         a connecting member extending through the radially extending passage, the connecting member including a first end section connected to the first member and a second end section that is received by the second member, wherein rotation of the shaft system causes the first member and the connecting member shift away from the second member into the inner surface of the outer shaft.

12. The aircraft system according to claim 11, wherein the first end section of the connecting member is fixedly connected to the first member.

13. The aircraft system according to claim 12, wherein the first end section of the connecting member is integrally formed with the first member.

14. The aircraft system according to claim 12, wherein the connecting member includes an outer surface portion that extends continuously from the first member to the second member.

15. The aircraft system according to claim 12, wherein the first member includes an outer surface section that selectively engages the inner surface of the outer shaft.

16. The aircraft system according to claim 15, wherein contact between the outer surface section and the inner surface of the outer shaft generates a frictional force that dampens shaft oscillations.

17. The aircraft system according to claim 11, wherein the first member includes a first mass and the second member includes a second mass that is substantially equal to the first mass.

18. The aircraft system according to claim 11, further comprising: an input member connected to the inner shaft.

19. The aircraft system according to claim 18, wherein the outer shaft comprises a generator rotor shaft.

20. The aircraft system according to claim 11, wherein the second member includes a central passage that is aligned with the radially extending passage, the connecting member extending into the central passage.

* * * * *